United States Patent [19]
Swift

[11] Patent Number: 5,710,978
[45] Date of Patent: *Jan. 20, 1998

[54] LOGGING RECORDER SYSTEM FOR TRUNKING RADIO

[75] Inventor: Carl J. Swift, Houston, Tex.

[73] Assignee: Swift Computers, Inc., Stafford, Tex.

[*] Notice: The term of this patent shall not extend beyond the expiration date of Pat. No. 5,625,890.

[21] Appl. No.: 450,029

[22] Filed: May 25, 1995

Related U.S. Application Data

[63] Continuation-in-part of Ser. No. 85,124, Jun. 29, 1993, abandoned.

[51] Int. Cl.$^6$ .............................. H04B 17/00; H04Q 7/34
[52] U.S. Cl. .............................. 455/67.1; 455/9; 455/18; 455/53.1; 369/7; 369/49
[58] Field of Search .................. 455/9, 18, 53.1, 455/54.1, 56.1, 67.1, 67.7; 340/825.06, 825.15; 360/32; 369/6, 7, 48, 49, 61, 98; 379/45, 73, 84, 85

[56] References Cited

U.S. PATENT DOCUMENTS

| | | |
|---|---|---|
| 684,641 | 10/1901 | Kaufmann . |
| 684,999 | 10/1901 | Mead . |
| 3,575,558 | 4/1971 | Leyburn . |
| 3,806,804 | 4/1974 | Mills et al. . |
| 3,882,457 | 5/1975 | En . |
| 3,898,390 | 8/1975 | Wells et al. . |
| 4,012,597 | 3/1977 | Lynk, Jr. et al. . |
| 4,013,843 | 3/1977 | Lupattelli et al. . |
| 4,055,832 | 10/1977 | En . |
| 4,188,508 | 2/1980 | Rogers et al. . |
| 4,271,520 | 6/1981 | Coombes et al. . |
| 4,312,070 | 1/1982 | Coombes et al. . |
| 4,352,955 | 10/1982 | Kai et al. . |
| 4,517,669 | 5/1985 | Freeburg et al. . |
| 4,519,068 | 5/1985 | Krebs et al. . |
| 4,553,262 | 11/1985 | Coe . |
| 4,577,060 | 3/1986 | Webb et al. . |
| 4,590,473 | 5/1986 | Burke et al. . |
| 4,594,591 | 6/1986 | Burke . |
| 4,612,415 | 9/1986 | Zdunek et al. . |
| 4,637,022 | 1/1987 | Burke et al. . |
| 4,654,777 | 3/1987 | Nakamura . |
| 4,658,435 | 4/1987 | Childress et al. . |
| 4,679,244 | 7/1987 | Kawasaki et al. . |
| 4,684,941 | 8/1987 | Smith et al. . |
| 4,692,945 | 9/1987 | Zdunek . |
| 4,701,944 | 10/1987 | Howard et al. . |
| 4,716,407 | 12/1987 | Borras et al. . |
| 4,718,108 | 1/1988 | Davidson et al. . |
| 4,723,264 | 2/1988 | Sasuta et al. . |
| 4,891,835 | 1/1990 | Leung et al. . |
| 5,392,449 | 2/1995 | Shaughnessy et al. . |

Primary Examiner—Chi H. Pham
Attorney, Agent, or Firm—Fish & Richardson P.C.

[57] ABSTRACT

A logging recorder system for trunking radio includes a device which monitors a plurality of channels of the trunking radio system and outputs analog signals representative thereof. A digitizer is then provided for digitizing the analog signals, and a controller breaks the digitized signals into segments and stores the segments on a storage device. The controller also generates an index of locations of the segments on the storage device. The controller may then be used to selectively play back a desired conversation by automatically combining segments from the storage device based on the index.

40 Claims, 14 Drawing Sheets

FIG. 11

| TRUNKING SYSTEM CHANNEL NUMBER | RECEIVER FREQUENCY MHz. | FCC CHANNEL NUMBER | VCM CHANNEL ADDRESS |
|---|---|---|---|
| 1 | 855.9125 | 197 | 0 |
| 2 | 855.1875 | 168 | 1 |
| 3 | 854.9375 | 158 | 2 |
| 4 | 855.6375 | 186 | 3 |
| 5 | 854.9125 | 157 | 4 |
| 6 | 860.3625 | 375 | 5 |
| 7 | 859.3625 | 335 | 6 |
| 8 | 858.3625 | 295 | 7 |
| 9 | 857.3625 | 255 | 8 |
| 10 | 856.3625 | 215 | 9 |
| 11 | 855.1625 | 167 | 10 |
| 12 | 860.3375 | 374 | 11 |
| 13 | 859.3375 | 334 | 12 |
| 14 | 858.3375 | 294 | 13 |
| 15 | 857.3375 | 254 | 14 |
| 16 | 856.3375 | 214 | 15 |
| 17 | 855.4125 | 177 | 16 |
| 18 | 855.8625 | 195 | 17 |
| 19 | 855.1125 | 165 | 18 |
| 20 | 855.6875 | 188 | 19 |
| 21 | 855.6125 | 185 | 20 |
| 22 | 855.6625 | 187 | 21 |
| 23 | 855.1375 | 166 | 22 |
| 24 | 855.3875 | 176 | 23 |
| 25 | 855.8875 | 196 | 24 |
| PLAYBACK CHANNEL | | | 25 |

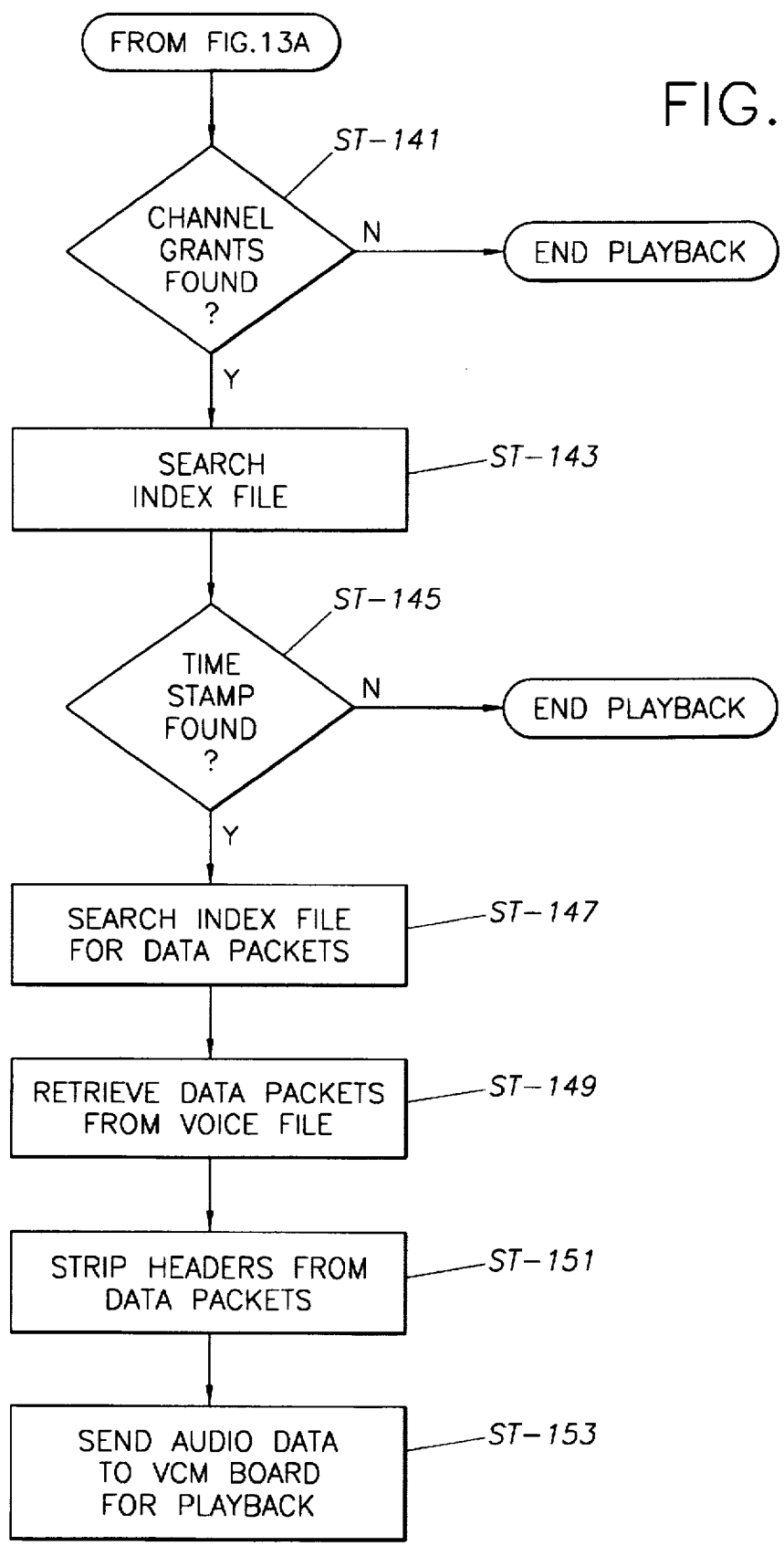

LOGGING RECORDER SYSTEM FOR TRUNKING RADIO

This application is a continuation-in-part of U.S. Ser. No. 08/085,124, filed Jun. 29, 1993 now abandoned.

FIELD OF THE INVENTION

The invention relates to a logging recorder system. More particularly, the invention relates to a logging recorder system for digitizing and logging transmissions from a trunking radio system and for selectively de-trunking and playing back desired information.

BACKGROUND OF THE INVENTION

Trunking radio systems are widely used in dispatch applications today. A basic trunking radio system is described in U.S. Pat. No. 4,012,597 assigned to Motorola, Inc., and more recent examples of trunking radio systems are disclosed in U.S. Pat. Nos. 4,612,415, 4,692,945, and 4,723,246, all assigned to Motorola, Inc. Because these systems are well-known, the operational details of trunking radio will not be described herein. However, the conceptual basis of a trunking radio is illustrated in prior art FIG. 1.

A typical trunking radio system includes a plurality of subscriber stations 1A–1C, at least one centrally located repeater 3, and a control station 5. While only three subscriber stations are shown in FIG. 1, there typically will be many times this number in an actual system. The trunking radio system maintains communication between each subscriber station and the control station 5, as well as between individual subscriber stations. Because the number of channels allotted to the system typically is much smaller than the number of subscriber stations, the control station 5 assigns channels for communications on an as-needed basis.

FIG. 2 shows how channel assignment typically occurs in a trunking radio system. When not transmitting or receiving, each subscriber station monitors a predetermined control frequency or control channel 6. One of the subscriber stations initiates a communication on the system by transmitting a channel request to the control station 5 (FIG. 1) on the control channel 6. The request includes the subscriber station's ID (radio ID) and talk group ID, and is known as the Inbound Signalling Word (ISW). A talk group is a group of stations with a common interest, such as all of the members of a certain repair team, etc. The control station 5 responds to the subscriber station via the control channel 6 with an Outbound Signalling Word (OSW) 2 that assigns one of the talk channels 7 to the subscriber station (i.e., issues a "channel grant" to the requesting station). Examples of channel grants are group grants for talk group conversations, private grants for transmissions between individual subscriber stations, and telephone interconnect grants for transmissions between a subscriber station and a telephone. If a channel grant involves an emergency, the subscriber stations involved receive special priority. Any type of channel grant may be declared an emergency, but emergency grants typically are issued to talk groups.

For each channel request, the control station 5 knows the identity of the subscriber station that sent the request, its talk group, and the channel to which the communication is assigned. When the channel grant is issued, the controller station instructs the other subscriber stations within the initiating station's talk group to receive on the assigned frequency. When the communication is complete, the control station 5 issues a "channel release" command 4 to recover the channel for further assignment, and the members of the talk group again monitor the control channel 6. Thus, a response to the initiating subscriber station from one of the other stations in the talk group is likely to be assigned to a different channel than the one to which the original communication was assigned. When a response is initiated, the control station 5 advises all stations within the talk group of the new channel assignment.

Like the communications within a talk group, the control channel 6 itself may move between frequencies. However, the frequencies used for the control channel are not randomly assigned. The control channel normally has a 100% duty cycle, and the frequencies used for the control channel are preassigned and are rotated on a scheduled basis. As a result, the subscriber stations must analyze the signal content of the authorized control channel frequencies to determine which is the control channel 6 at any given moment. Because the control channel 6 transmits data signals instead of voice signals, the subscriber stations are able to quickly distinguish the control channel 6 from the talk channels 7.

As a result of the above-described arrangement, when, for example, fifty or more talk groups are on the trunking radio system (each of which includes a number of individual stations) each talk channel 7 carries a virtually constant stream of small segments 8 from unrelated conversations. While the subscriber stations can follow the conversation by switching channels in response to the control information, it is impossible to follow any one conversation by monitoring any one of the channels.

It is frequently desirable to maintain a log of all transmissions over a dispatch radio system. For example, when the dispatch system is used for emergency response, it is often desirable to retrieve the original dispatch information and the content of conversations between the dispatched units. With a trunking radio system, however, this is very difficult. If one simply were to record signals on each channel, it would be impossible for the reasons explained above to reproduce any one complete conversation from any one of the channels. On the other hand, recording the conversations of each talk group individually is economically unfeasible because it would require a number of receivers and storage devices equal to the number of talk groups. Furthermore, recording group transmissions in this manner does not capture private radio-to-radio conversations or radio-to-telephone interconnect conversations. Clearly, it is not practical to have a separate receiver and recorder for each talk group, especially since not all conversations can be recorded. Thus, prior to the present invention, there was no economically feasible way to log trunking radio systems for future retrieval of data.

SUMMARY OF THE INVENTION

The present invention provides a logging recorder system which records communications made over a trunking radio system in "trunked" form and has the ability to selectively play back and "de-trunk" any desired conversation in its entirety.

Particularly, in one embodiment, the invention relates to a digital logging system, comprising: a plurality of fixed frequency radios each of which monitors a selected channel of a trunking radio system; a controller which records selected segments of outputs from the fixed frequency radios on a storage device in indexed fashion; and means for playing back a desired conversation by automatically combining said segments based on the index.

In another embodiment, the invention relates to a digital logging recorder for a trunking radio system, comprising:

means for monitoring a plurality of channels of the trunking radio system and outputting analog signals representative thereof; means for digitizing the analog signals; control means for breaking the digitized signals into segments and storing the segments on a storage device; means for generating an index of locations of the segments on the storage device; and means for playing back a desired conversation by automatically combining segments from the storage device based on the index.

In a further embodiment, the invention relates to a method of logging a digital trunking radio system, comprising the steps of: monitoring a plurality of channels of the trunking radio system and outputting analog signals representative thereof; converting the analog signals to digital signals; breaking the digital signals into segments and appending ID information into the segments; storing the segments on a storage device and generating an index of storage locations of the segments; and selectively playing back a desired conversation by automatically combining segments from the storage device using the index.

BRIEF DESCRIPTION OF THE DRAWINGS

FIG. 11 is a channel configuration table according to an embodiment of the invention;

FIGS. 13A through 13C are a flow diagram illustrating playback of compressed audio according to an embodiment of the present invention;

DETAILED DESCRIPTION

Preferred embodiments of the invention will now be described with reference to the accompanying figures.

Figure 1:
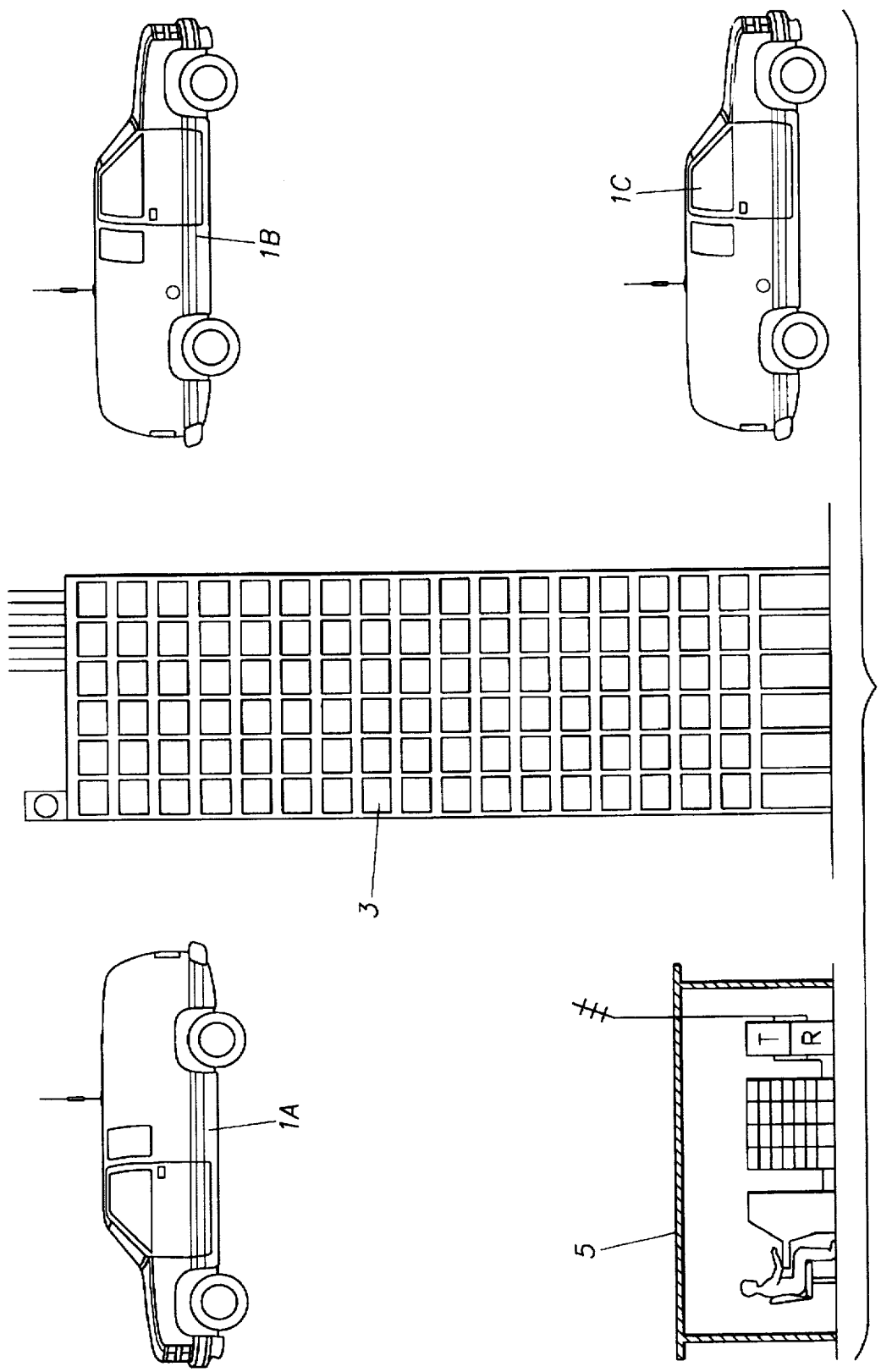
FIG. 1 is a stylized drawing illustrating a typical prior art trunking radio system.
Figure 2:
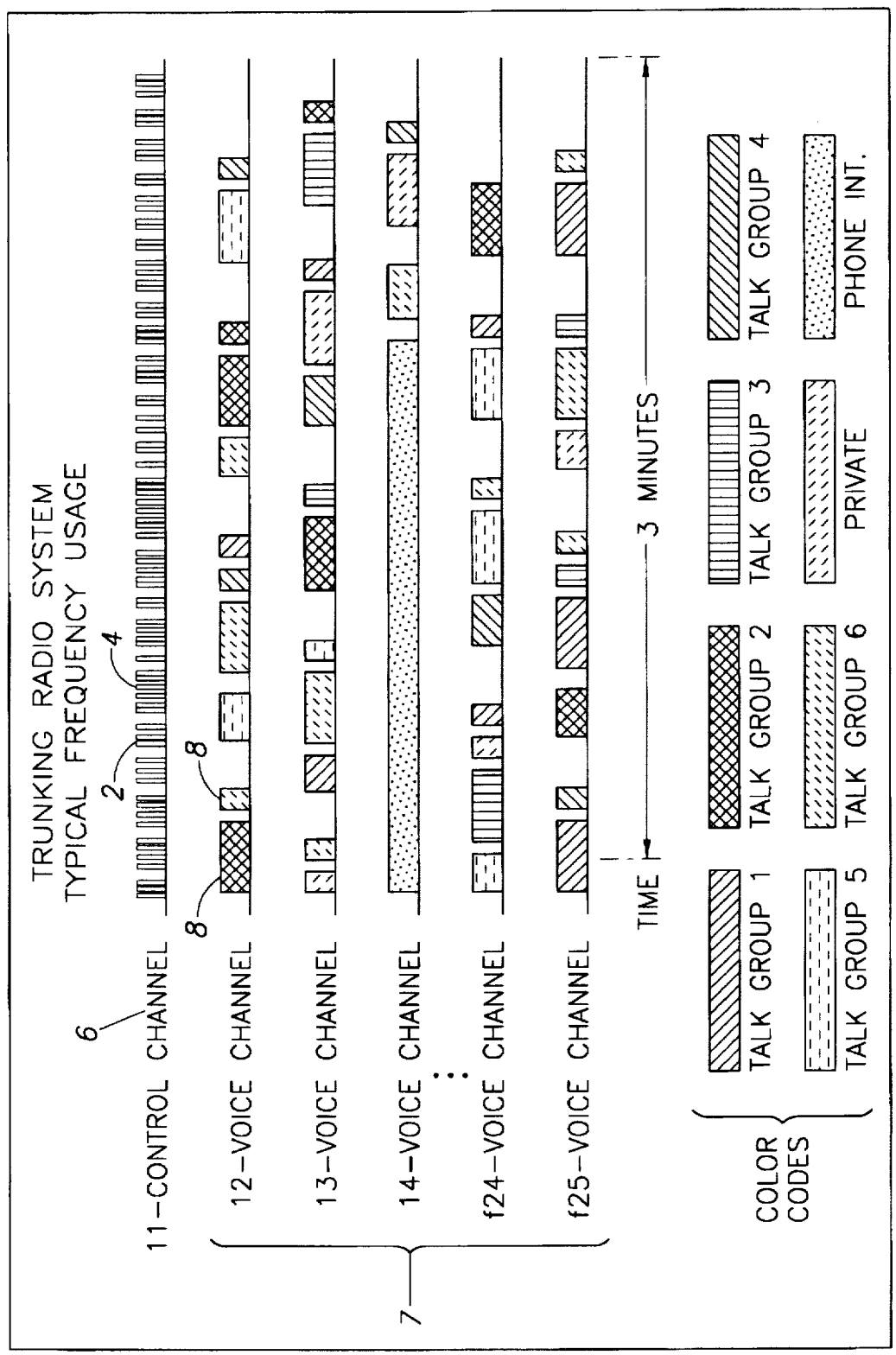
FIG. 2 is a diagram illustrating a typical allocation of channels in a trunking radio system.
Figure 3:
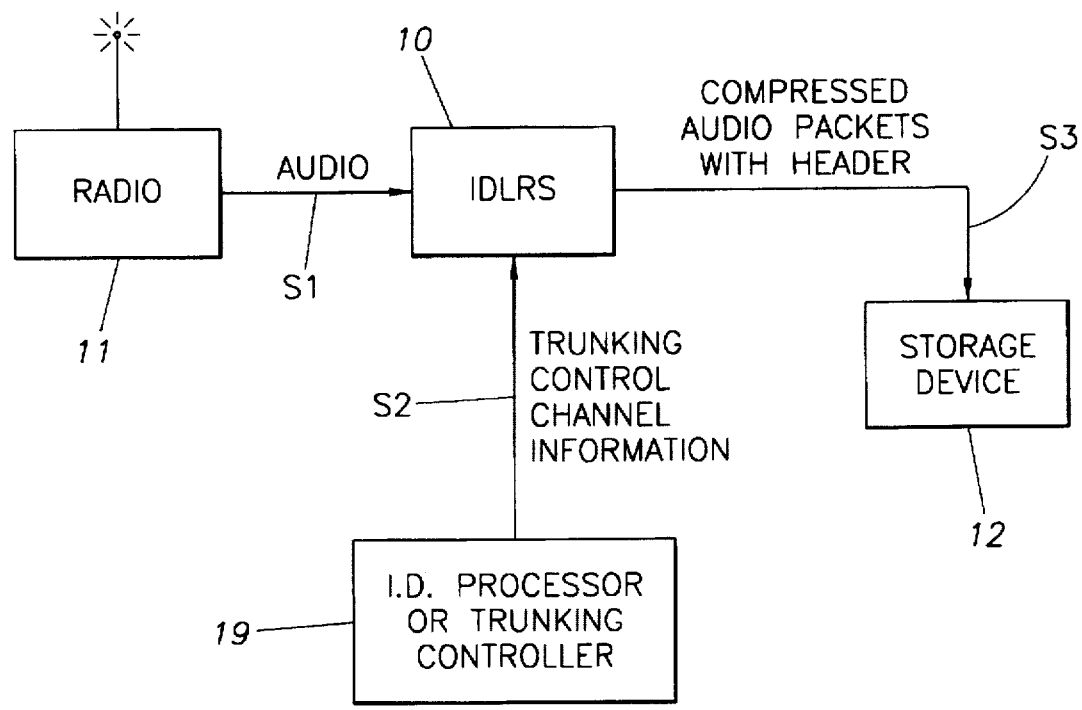
FIG. 3 is a functional block diagram of a trunking radio recording process according to an embodiment of the present invention.

A block diagram of an embodiment of a trunking radio recording process using an Intelligent Digital Logging Recording System (IDLRS) 10 is illustrated in FIG. 3. A fixed frequency radio 11 is provided for each of the trunking channels which, in a typical system, is twenty-five channels. Each of the twenty-five channels is capable of transmitting audio signals, and a few of the channels (e.g., four channels) also are capable of transmitting data signals. The channels configured for both audio and data transmission are "authorized" control channel frequencies. At all times, one of the audio/data channels will serve as a control channel for the trunking radio system. As discussed above, the control channel assignment will rotate between the authorized frequencies.

The audio output S1 of each fixed frequency radio 11 is applied to IDLRS 10. An ID processor 19, which includes a receiver (not shown in FIG. 3) tuned to the trunking radio system's control channel, monitors the control channel for channel grants and releases. When channel control information of any kind is detected, the ID processor 19 decodes the control information and provides it to the IDLRS 10. The IDLRS 10 interprets the control information to identify the channel grant or release and the talk channel, the talk group, and the individual subscriber station affected. For a channel grant, the IDLRS begins recording the audio signal on the granted channel. For a channel release, the IDLRS 10 stops recording the released channel. ID processors, such as the Motorola Radio Interface Module II, are known in the art. Alternatively, the trunking radio system controller may provide the channel control information directly to the IDLRS 10, thereby eliminating the need for the ID processor 19. The trunking controller also may provide transmissions from the communication channels to the IDLRS 10, thus eliminating the need for the fixed frequency radios 11.

As the IDLRS 10 records audio signals S1 from the talk channels, it digitizes and compresses the received audio signals S1 and combines the compressed audio with the control information from the ID processor 19 to form data packets S3. The IDLRS 10 then stores the data packets S3 to a relatively fast storage medium, such as a hard disk (not shown in FIG. 3). As data packets S3 accumulate, they are written to a mass storage device 12, such as a tape drive or a CD-ROM.

Figure 4:
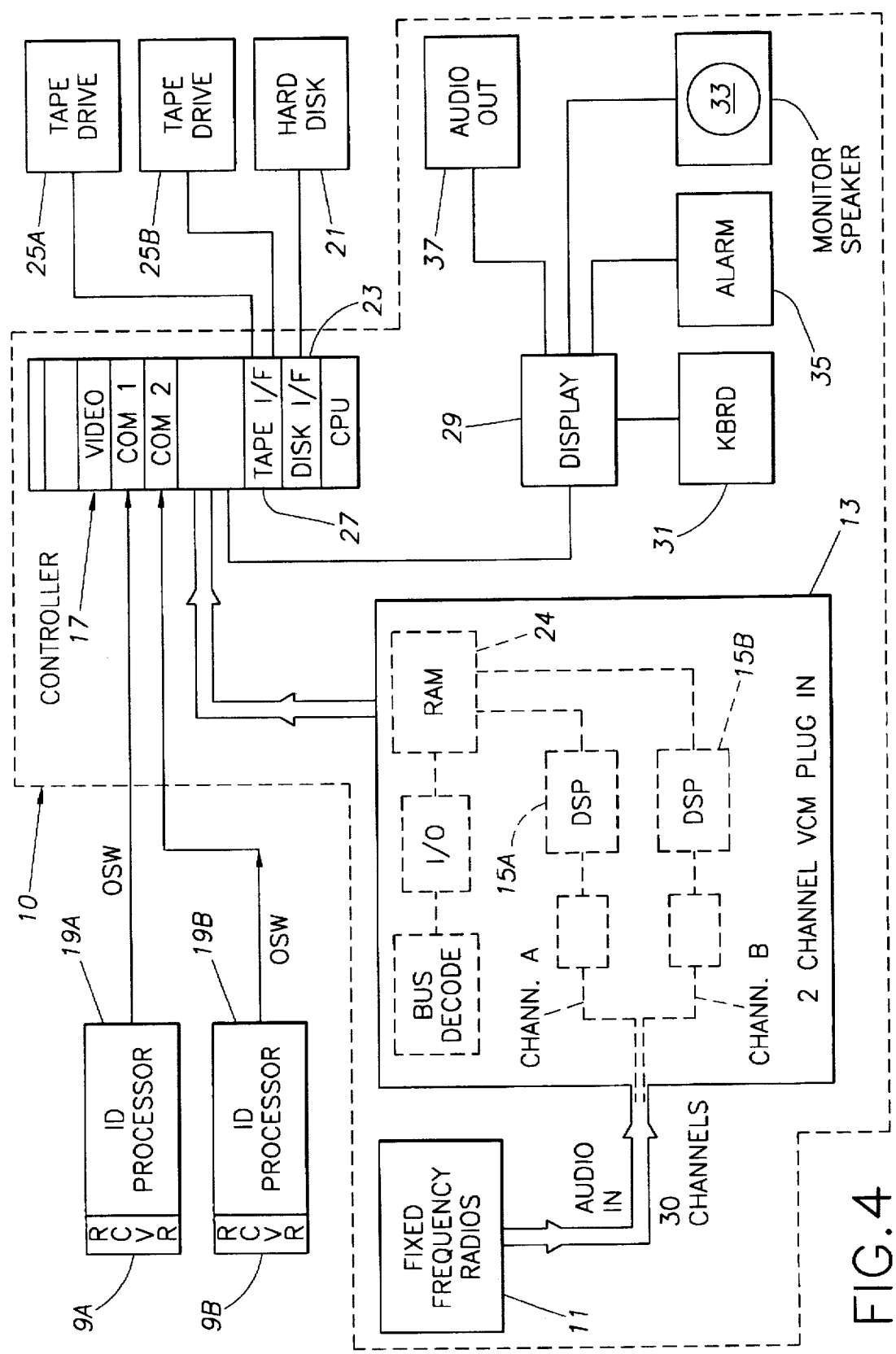
FIG. 4 is a block diagram illustrating a logging recorder according to an embodiment of the present invention.

FIG. 4 illustrates an embodiment of the IDLRS 10. Variable frequency receivers 9A, 9B in ID processors 19A, 19B receive control data from the control channel. The ID processors 19A, 19B decode the control data to recover the Outbound Signalling Word (OSW), and then provide the OSW to the IDLRS 10. A controller 17 in the IDLRS 10 decodes the OSW to recover the channel grant or release, the talk channel, the talk group ID, and the subscriber station ID (radio ID). Talk signal processing is handled in the IDLRS 10 by several voice coding module (VCM) boards 13. Each VCM board 13 may handle any number of talk channels, but preferably each board 13 handles two talk channels (channels A and B). Although only one VCM board is shown in the figure, a typical logging recorder has thirteen VCM boards (one for each pair of channels). The VCM boards serve two primary purposes: 1) to convert incoming audio signals into compressed digital data packets for storage; and 2) to convert stored digital data packets into audio for playback.

Each VCM board 13 is connected to two fixed frequency radios 11, each of which receives audio signals from one of the two talk channels A, B. The incoming audio on the talk channels A, B is processed by digital signal processors (DSP) 15A, 15B and then stored to a dual port RAM 24 before being sent to the controller 17. The controller 17 combines the audio data from the VCM boards 13 with control information from the OSW and temporarily stores the combined data to a hard disk 21 through disk interface 23. The data also may be stored to an electronic memory device, such as random access memory (RAM) or flash memory. To prevent the hard disk 21 from becoming full, the controller 17 periodically copies the audio and control information to tape drives 25A, 25B through tape drive interface 27, or to any other mass storage medium, such as an optical memory device (e.g., on optical disk).

Operator interface for the system is provided by an alphanumeric display 29 and a keyboard 31. The system also includes a monitor speaker 33 that allows the system to playback a desired transmission, and an alarm that indicates any failures or errors in the system. An audio out terminal 37 allows the user to record played-back audio to an external storage medium (not shown).

Figure 5:
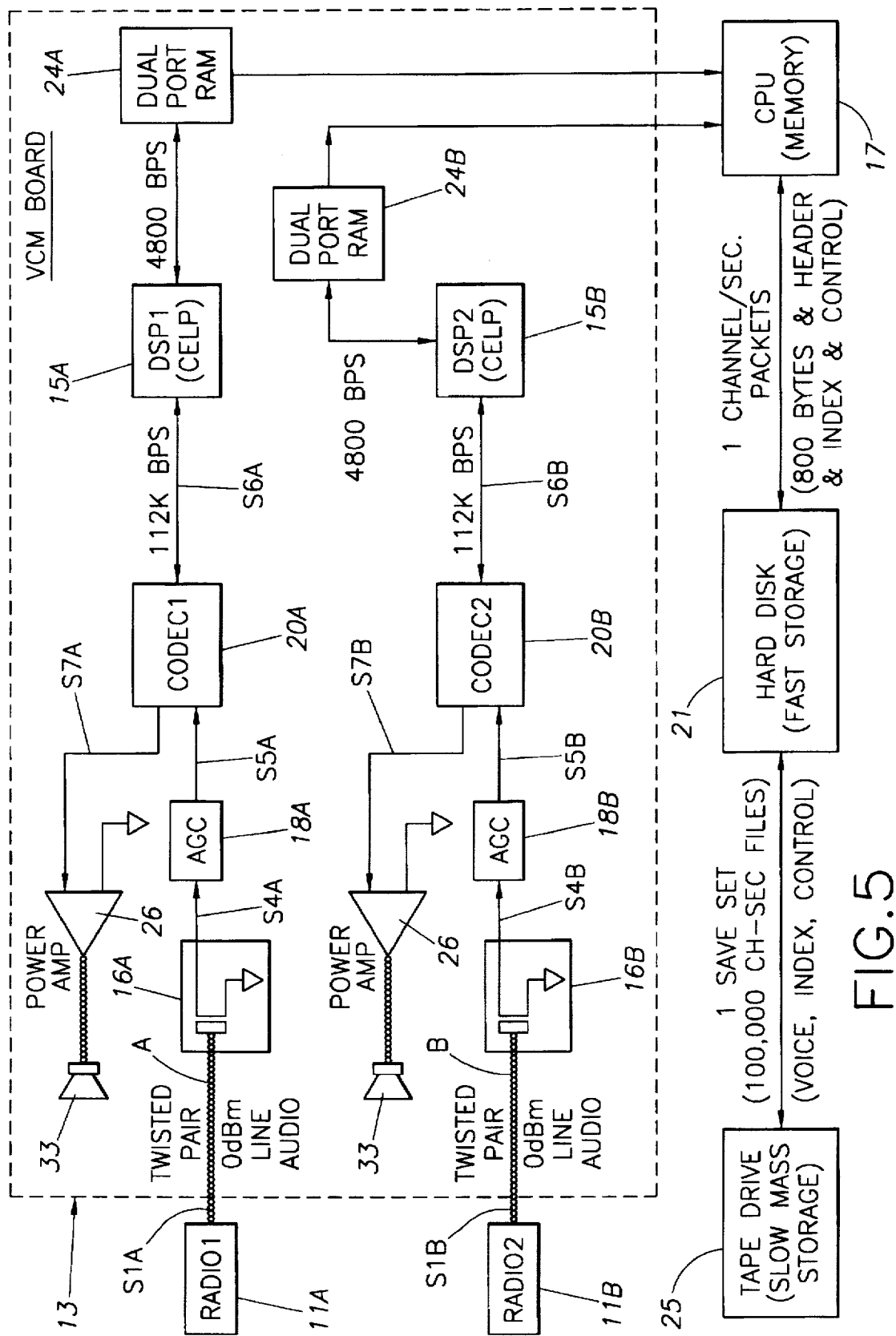
FIG. 5 is a block diagram further illustrating a logging recorder in accordance with the embodiment of FIG. 4.

FIG. 5 shows the IDLRS 10, and particularly a VCM board 13, in more detail. Each VCM board 13 supports audio compression on two channels, each of which receives a differential audio signal S1A, S1B from a fixed frequency receiver 11A, 11B over a 600 ohm balanced line with an optimum level of 0 dBm. The differential audio signals S1A, S1B are converted into single-ended ground reference signals S4A, S4B by 600 ohm matching transformers 16A, 16B. Automatic gain circuits (AGCs) 18A, 18B smooth the audio signals S4A, S4B to 0 dBm signals S5A and S5B, compensating for levels from −30 dBm to +10 dBm. The smoothed signals S5A, S5B are input to coder/decoder (codec) circuits 20A, 20B. Codecs 20A, 20B digitize the smoothed audio signals S5A, S5B by converting them into 14-bit PCM samples at a rate of 8000 samples per second. Thus, codecs 20A, 20B output 112K bit/sec digital audio signals S6A, S6B, which are passed serially to digital signal processors (DSPs) 15A, 15B. Each DSP 15A, 15B on a VCM board 13 operates independently of the other DSP 15A, 15B on the board 13 (i.e., one DSP 15A, 15B may process data while the other DSP 15A, 15B on the board 13 is inactive). The DSPs may, for example, be the Texas Instruments TMS320C30/31 DSP available from Texas Instruments.

The DSPs 15A, 15B use a CELP algorithm (described below) to compress the digital audio signals S6A, S6B into 4800 bit/sec data signals, although other baud rates (e.g., 7200, 9600) could be used. The DSPs 15A, 15B then store the audio data in memory. The DSPs 15A, 15B may share a dual port RAM memory 24 (FIG. 4), or, preferably, each DSP 15A, 15B may have a dual port RAM device 24A, 24B associated with it (FIG. 5). Instead of a memory device, the DSPs 15A, 15B may place the audio data in a first-in, first-out (FIFO) buffer (not shown). The controller 17 then retrieves the data from RAM 24A, 24B, (or from the FIFO buffer) appends control information from the ID processors (not shown in FIG. 5), and stores the information to the hard disk 21 and, eventually, to a tape drive 25.

The IDLRS 10 may play back audio in one of two ways: (1) by using the DSPs 15A, 15B to convert digital audio data to analog audio signals between data compression cycles (i.e., while the DSPs 15A, 15B collect samples), or (2) by dedicating a VCM channel to audio playback. Using the DSPs 15A, 15B to record and playback audio data between compression cycles is particularly advantageous when the trunking radio channels will occupy every available VCM channel. Dedicating a VCM channel to playback is advantageous when a VCM board has a channel to spare. For typical twenty-five channel system, one channel of the thirteenth VCM board may be dedicated to playback. In either situation, the logging recorder is able to "simultaneously" record and play back audio (i.e., play back without interrupting the recording process).

During playback of recorded audio, the controller 17 retrieves data from the storage devices 21, 25 and provides the data to the appropriate VCM channel through the dual port RAM 24A, 24B. The DSPs 15A, 15B and codecs 20A, 20B then convert the data into analog playback signals S7A, S7B which are played back to the operator through power amplifier 26 and the monitor speaker 33. Playback is described in more detail below.

Figure 6:
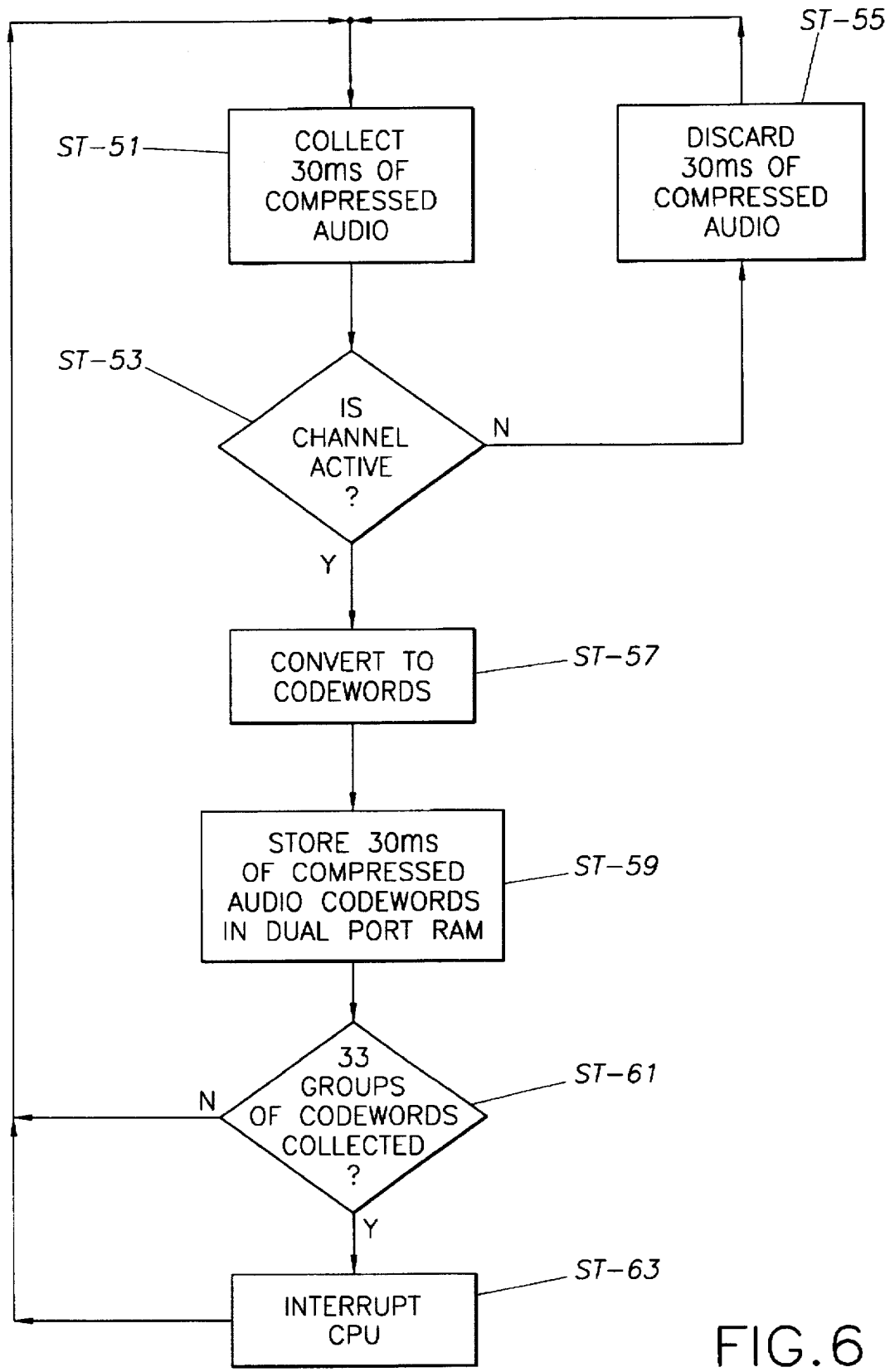
FIG. 6 is a flow diagram illustrating the storage of audio according to an embodiment of the present invention.

FIG. 6 shows the CELP compression algorithm used by the DSPs 15A, 15B. The DSPs 15A, 15B receive a continuous bit stream from the codecs 20A, 20B, even when the VCM board 13 is receiving "dead air" from the receiver, and collect (ST-51) the digital audio from the codecs 20A, 20B in 30 ms groups of samples. When a channel is not active (ST-53), the corresponding DSP 15A, 15B discards (ST-55) the 30 ms sample groups. If the channel is active, the controller 17 sets a status bit on the VCM board 13 that instructs the corresponding DSP 15A, 15B to process the sample groups. If an audio/data channel is serving as the control channel, the status bit is not set, so the channel is treated as inactive and the sample groups are discarded. When the status bit is set, the DSP 15A, 15B converts (ST57) each sample group into eighteen 8-bit codewords (144 bits) and stores (ST-59) the codewords in the corresponding dual port RAM 24A, 24B on the VCM board 13. At a transmission rate of 8000 samples per sec, each 30 ms sample group contains 240 samples, or 3360 bits (14 bits per sample), so DSPs 15A, 15B compress audio data at a ratio of 23⅓:1. When DSPs 15A, 15B have collected (ST-61) thirty-three 30 ms sample groups, or "one channel-second" of data (33×30 ms=999 ms), the VCM board 13 sends (ST-63) an interrupt to the controller 17 to indicate that data is ready for storage. When a transmission is completed and the channel is released, the controller 17 alters the status bit on the VCM board 13 to instruct the DSP 15A, 15B to stop processing data and the VCM board 13 to stop sending interrupts.

One channel-second of data contains approximately 4800 bits (33 groups×144 bits/group=4752 bits=594 bytes), so DSPs 15A, 15B output digital audio data at a rate of 4800 baud. Other data rates (e.g., 7200 baud or 9600 baud) may be used by adjusting the transmission rate of the codecs 20A, 20B or the compression ratio of the DSPs 15A, 15B. Because compression ratio directly determines the recording capacity of the system, changes in compression ratio should be made with storage capacity in mind. Compression ratio must fall within a range that allows the user to identify the speaker and understand the content of recorded audio as it is decompressed and played back.

Figure 7:
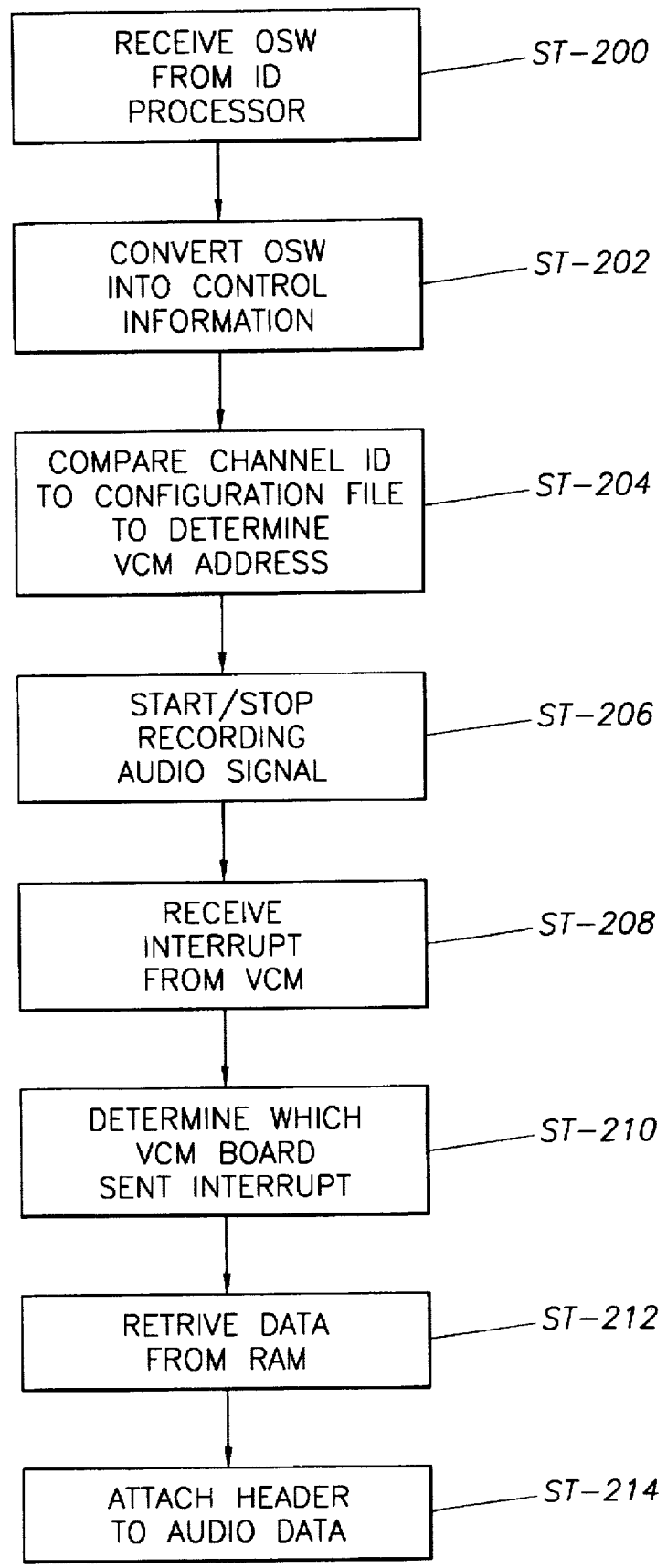
FIG. 7 is a flow diagram illustrating the use of control information in the storage of audio according to an embodiment of the invention.

FIG. 7 illustrates how the IDLRS 10 recovers and uses channel control information. The controller 17 receives (ST-200) an Outbound Signalling Word (OSW) from one of the ID processors 19A, 19B and converts (ST-202) the OSW into channel control information. The channel control information identifies the channel grant or release, the channel ID, the requesting subscriber station ID, and the group ID. The controller 17 compares (ST-204) the channel ID to entries in a configuration file 90 (FIG. 9) to determine which VCM board 13 handles the channel, and then instructs (ST-206) the proper channel of the VCM board 13 to start (channel grant) or stop (channel release) processing the audio signal on the channel. If a channel has been granted, the VCM board 13 processes the audio signal as described above. When the VCM board 13 interrupts (ST-208) the controller 17 to indicate that a channel-second of data is in the dual port RAM 24A, 24B, the controller 17 determines (ST-210) which VCM channel sent the interrupt and retrieves (ST-212) the data from the corresponding dual port RAM 24A, 24B. The controller then creates a "one channel-second data packet" (or simply "data packet") by attaching (ST-214) to the channel-second of data a header of indexing information generated from the control information.

Figure 8:
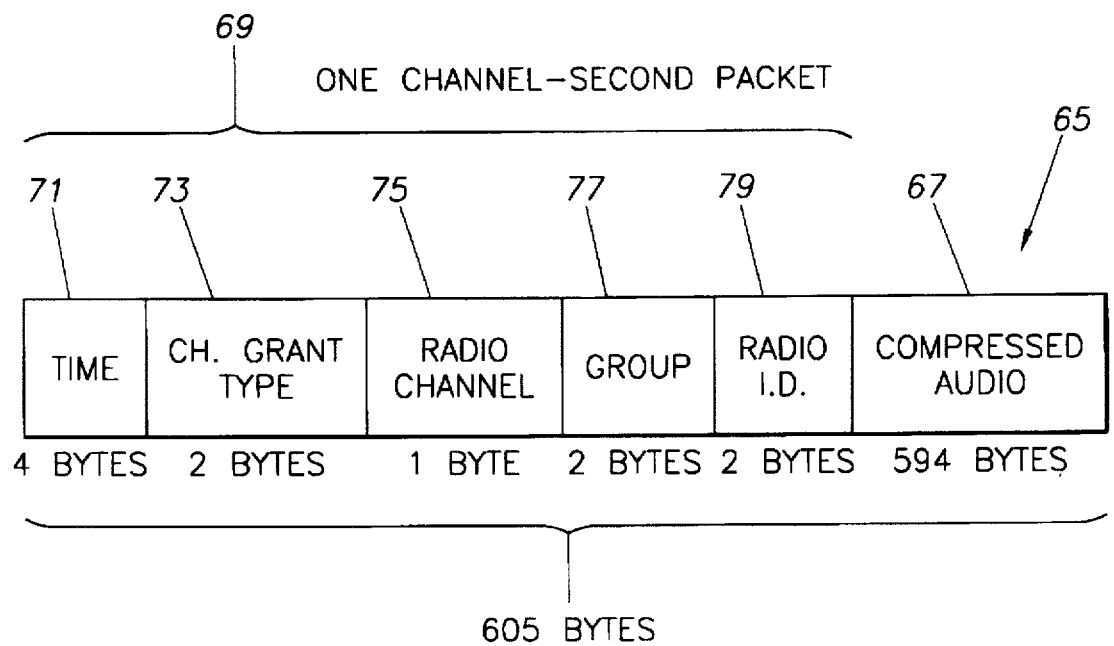
FIG. 8 is a diagram illustrating a data packet stored in accordance with the embodiment of FIG. 6.

FIG. 8 shows a data packet 65. Each data packet typically consists of 605 bytes of data, most of which (594 bytes) is compressed audio 67, and the rest of which (eleven bytes) is the header of indexing information 69. The first four bytes of the header 69 provide a time stamp 71 indicating the date and time that the packet was created, accurate to within one second. The time stamp is generated by the controller 17 and may be referenced to any internal or external time source. The next two bytes of the header 69 indicate the type 73 of channel grant involved in the transmission (e.g., talk group, telephone interconnect, private, emergency). The byte following the channel grant type 73 is a channel identifier 75 that identifies the trunking radio channel carrying the audio transmission. The group ID 77 of the transmitting subscriber station is contained in the next two bytes, and the station's radio ID 79 is contained in the last two bytes of the header 69. For telephone interconnect grants or private grants, the radio ID of the transmitting station appears in both the radio ID block 79 and the group ID block 77.

Figure 9:
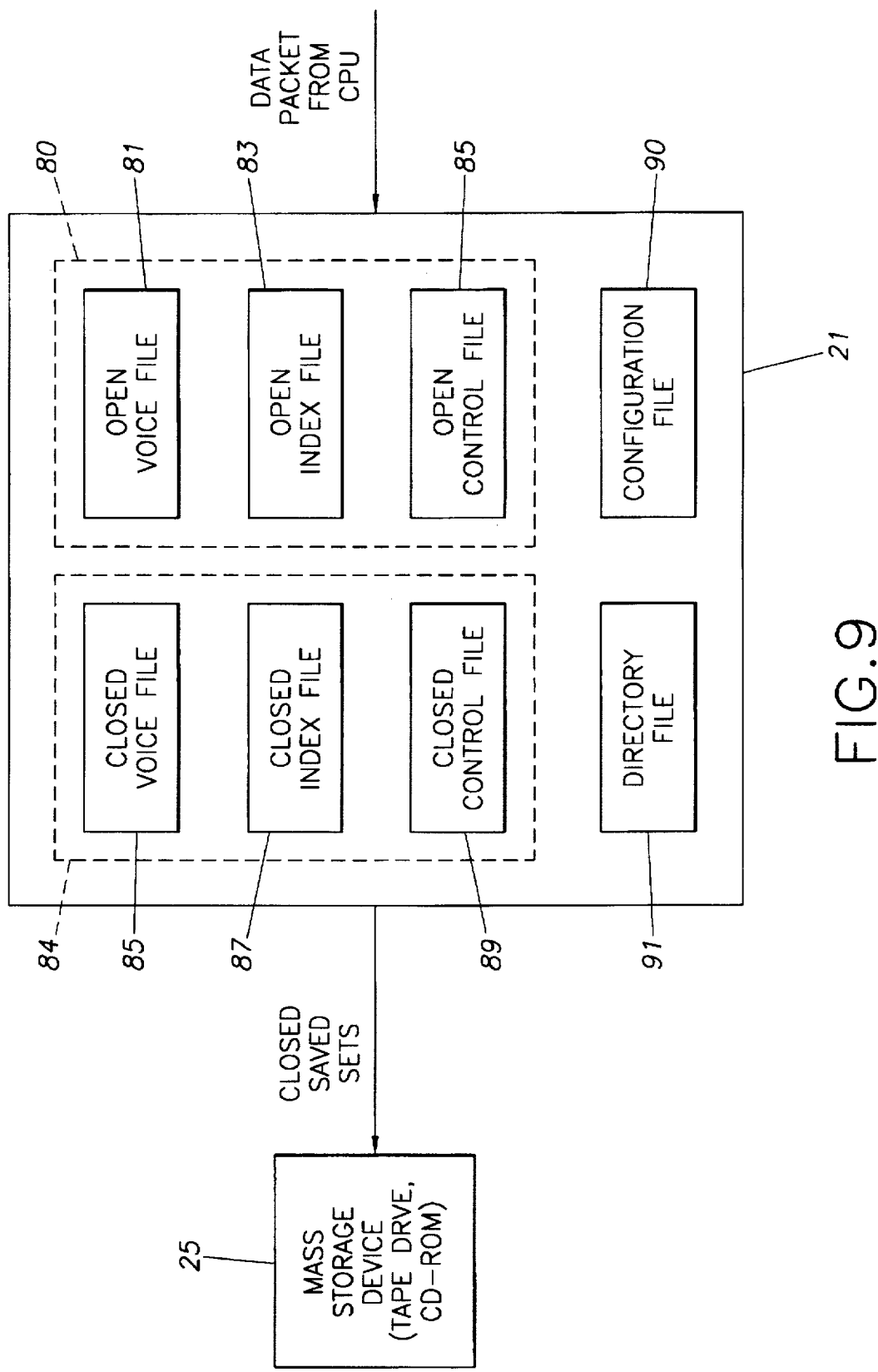
FIG. 9 is a block diagram illustrating the organization of information on a storage device according to an embodiment of the present invention.

Referring now to FIG. 9, after the controller 17 creates a data packet, it stores the entire data packet to a voice file 81 on the hard disk 21 (FIG. 5). The controller 17 also stores a duplicate of the header 69 (FIG. 8) in an index file 83 on the hard disk 21. The index file 83 allows the controller 17 to quickly identify data packets during playback. In addition, the controller 17 filters channel grants and channel releases from the control channel's data stream and stores this information in a control file 85 on the hard disk 21. The control file 85 also is used during playback. A configuration file 90 maintains a mapping between each trunking radio channel and the VCM board 13 that receives the trunking radio channel. This mapping allows the IDLRS to associate incoming audio data with both the trunking radio channel that transmitted it and the VCM board 13 that received it. The configuration file 90 also identifies the VCM board 13 that will be used during playback. The configuration file 90 is described in more detail below.

The voice file 81, index file 83 and control file 85 together form a save set 80. As voice, index and control data are added to the save set 80, the size of the save set 80 increases rapidly. When the save set reaches a predetermined size, it stops accepting data packets and becomes a closed save set 84. When the save set is closed, a new save set 80 opens to accept incoming data packets. The closed save set 84, which includes closed voice 85, index 87 and control 89 files, is then saved to a mass storage device 25, such as tape drives 25A, 25B (FIG. 4). Preferably, each save set collects 100,000 channel-seconds of audio (i.e., 100,000 data packets) before it is closed and stored to tape. In a typical save set of this size, the voice file contains about 60M bytes of data, the index file contains about 1.1M bytes of data, and the control file contains between 500K bytes and 2M bytes of memory, depending upon the activity of the control channel during the time that the save set is open. Tape drives 25A, 25B are preferably each eight millimeter 2.5 Gigabyte tape drives, but they may be larger or smaller in both size and storage capacity, depending upon the particular trunking radio system application.

In general, a closed save set 84 remains on the hard disk 21 even after it is saved to the mass storage device 25. This allows quick access to the information in the save set 84 when a playback is requested. Eventually, however, all storage space on the hard disk 21 will be consumed if save sets are allowed to accumulate unchecked. Hard disk 21 is preferably a 330 Megabyte disk, although it may be larger or smaller, depending upon the particular trunking radio system application. A 330 Megabyte disk typically will store three to four days worth of transmission data (although this is highly dependent on radio activity). When this capacity is reached, controller 17 purges the oldest save set from the hard disk 21. As a result, the most recent save sets are usually available on the hard disk 21, while at the same time, the hard disk 21 always has enough storage capacity to accept incoming data packets from the controller 17.

Figure 10:
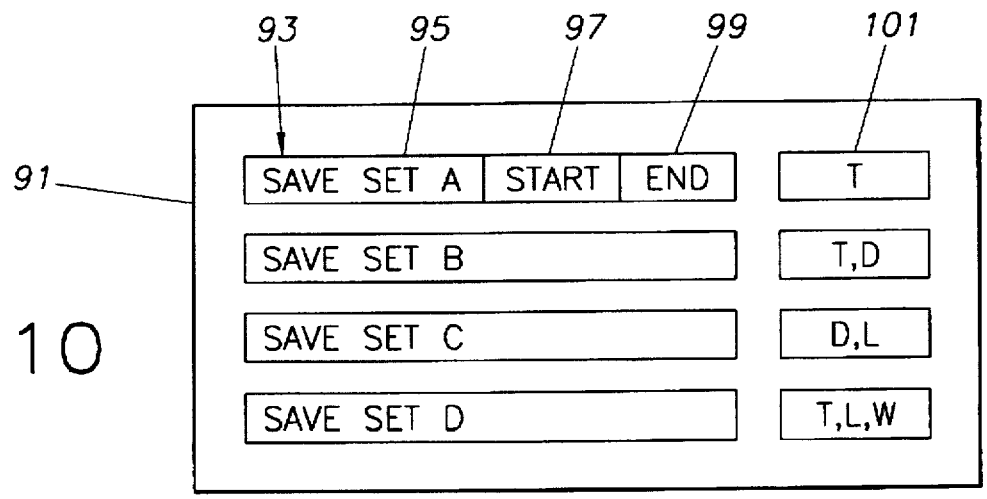
FIG. 10 illustrates a directory file according to an embodiment of the present invention.

Referring now to FIG. 10, the IDLRS 10 maintains a directory file 91 on the hard disk 21 that contains information about each save set, open and closed, stored on the hard disk 21 and tape drives 25A, 25B. When a save set is opened, a record 93 for the save set is created in the directory 91. Each record 93 includes a save set identifier 95 and time stamps 97, 99 for the start and end times of the save set. The start time stamp 97 is the time stamp from the first data packet in the save set, and the end time stamp 99 is the time stamp from the last data packet in the save set. Each record 93 also includes at least one flag 101 indicating the status of the save set. Four flags are possible: D, T, L, W. A "D" flag indicates that the save set is located on the hard disk, and a "T" flag indicates that the save set is located on a tape drive. If a save set is located in both locations, then the record 93 will contain both "D" and "T" flags. If a save set is stored on disk only, the record 93 also indicates the tape drive to which the save set will be stored. If the save set is stored on a tape drive, the record 93 indicates which tape drive contains the save set. An "L" flag indicates that the save set is locked, i.e., that it cannot be accessed. A record 93 contains an "L" flag when the corresponding save set is being archived to tape or if it is currently being written to by the controller. A "W" flag indicates that the save set is open and is currently being written to. Only the last record in the directory 91 can contain a "W" flag since only the most recent save set can be open. Every time a save set is stored to a tape drive, the controller copies the updated directory file 91 to a floppy drive (if one is available) to ensure that archived information can be retrieved in the event of a hard disk failure.

FIG. 11 shows a lookup table contained in a typical configuration file 90 in a digital logging recorder system with a dedicated playback channel. The first column of the table contains the channel number 90a of each system channel (numbered 1-26 for the typical twenty-five channel trunking radio system with a dedicated playback channel). The second column of the table provides the carrier frequency 90b associated with each system channel. The third column indicates the FCC channel number 90c (or the manufacturer's channel number) assigned to the carrier frequency, and the fourth column identifies the VCM channel 90d connected to the communication channel. The FCC or manufacturer's channel number is the channel ID transmitted in the Outbound Signalling Word (OSW). When the IDLRS receives a channel grant for a particular FCC channel 90c, the system uses the FCC channel number 90c to retrieve the corresponding VCM channel 90d from the configuration file 90. The system then instructs the corresponding VCM channel 90d to begin recording. The system also uses the FCC channel number 90c to retrieve the corresponding recorder channel number 90a and uses this number as the channel ID in the data packet headers. The system uses the system channel number 90a, instead of the FCC channel number 90c or VCM channel number 90d, in the data packet because the user will refer to the system channel number when requesting audio playback.

Figure 12:
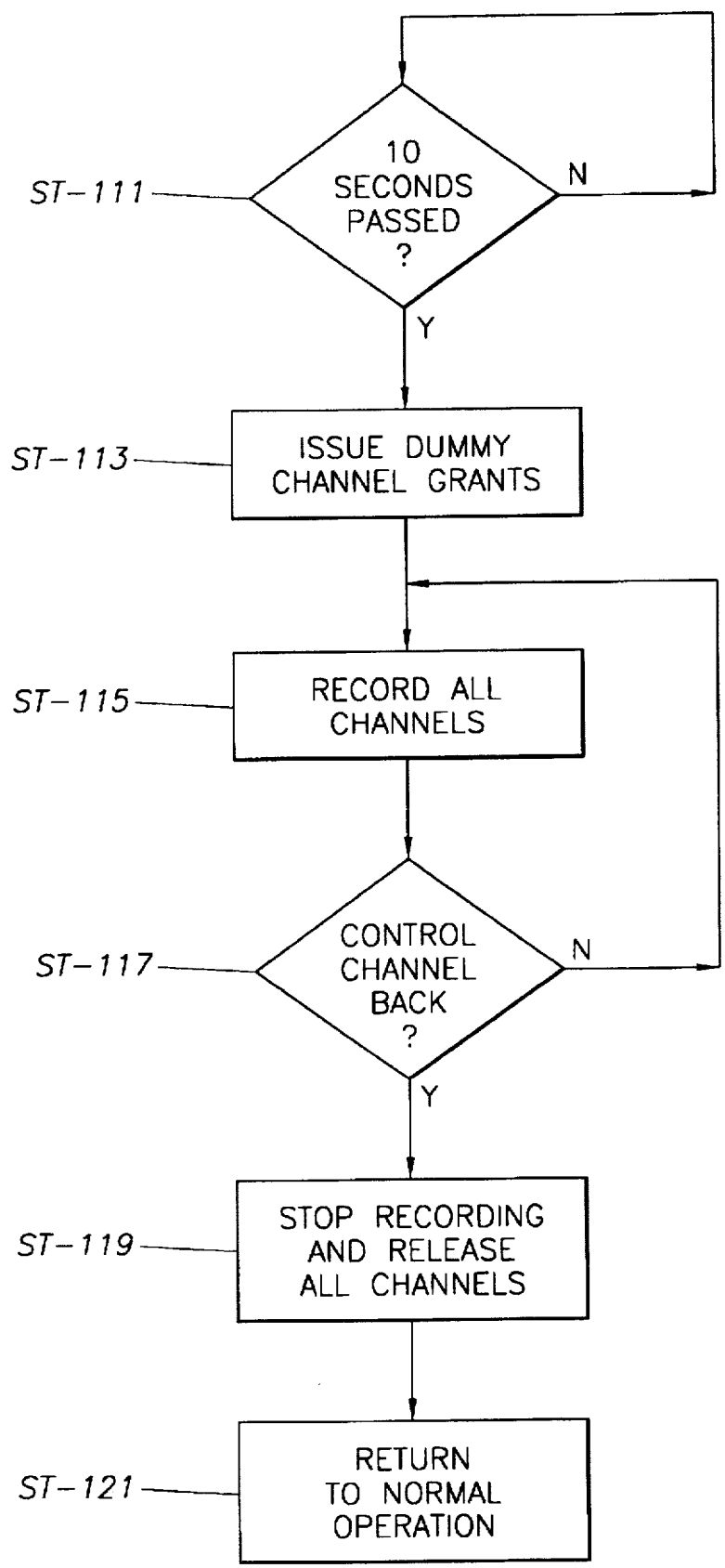
FIG. 12 is a flow diagram illustrating a mode of operation, according to an embodiment of the present invention, that allows the logging recorder to operate when the control channel fails.

As shown in FIG. 12, the IDLRS 10 also features a failsafe mode to protect against communication failures in the control channel. If the IDLRS does not receive (ST-111) information from the control channel for ten consecutive seconds, the IDLRS assumes that it has lost the control channel and issues (ST-113) a "dummy" channel grant for each channel in the trunking radio system. The "dummy" channel grants allow the IDLRS to record (ST-115) all incoming audio on every channel so that no communications are lost, even if no control information and group or radio ID is received. When communication with the control channel returns (ST-117), the IDLRS 10 stops (ST-119) recording and releases all channels and then returns (ST-121) to normal operation. Conversations recorded during failsafe mode can be recovered only by listening to all transmissions on each channel.

Figure 13A:
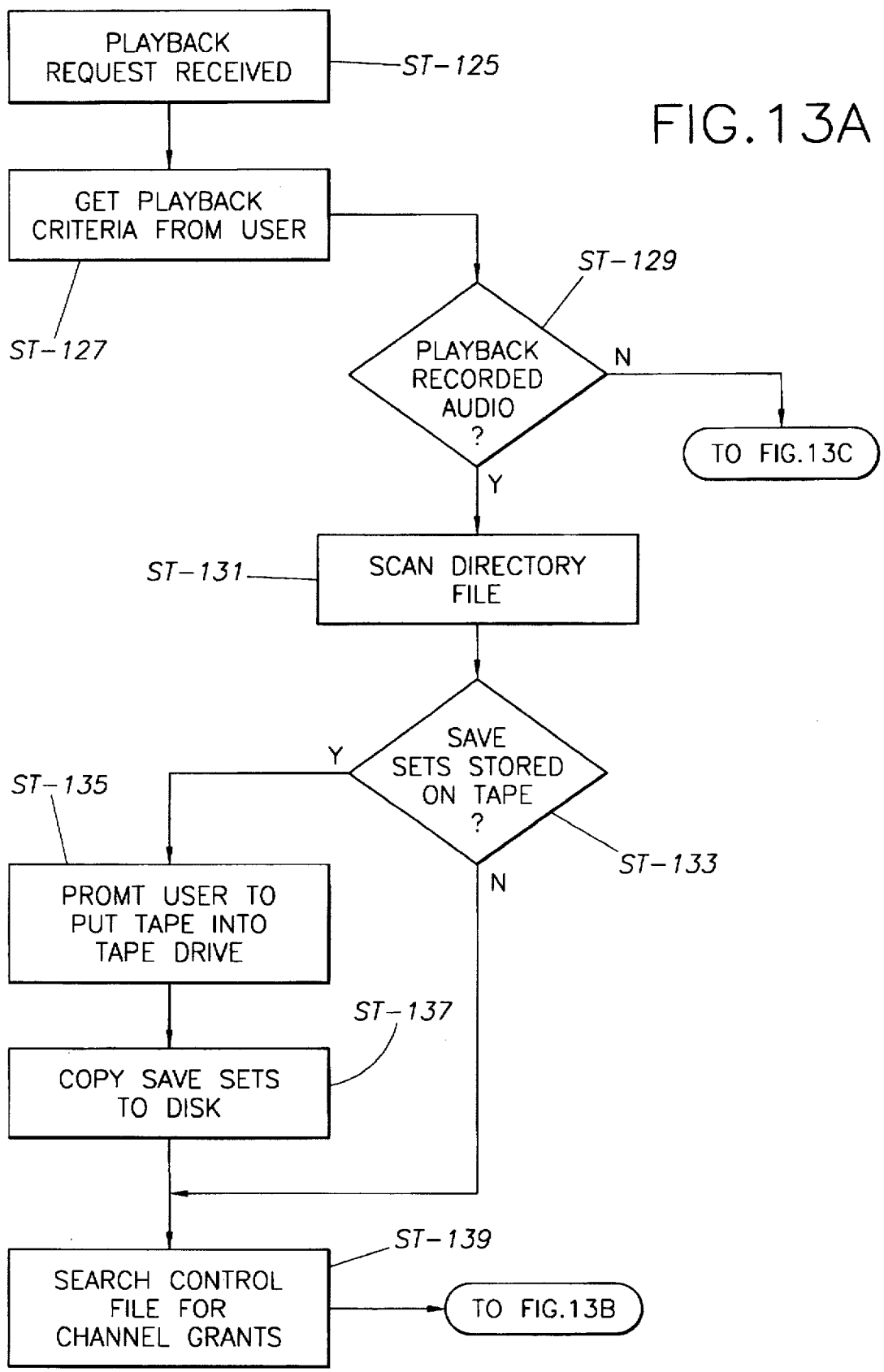
Figure 13C:
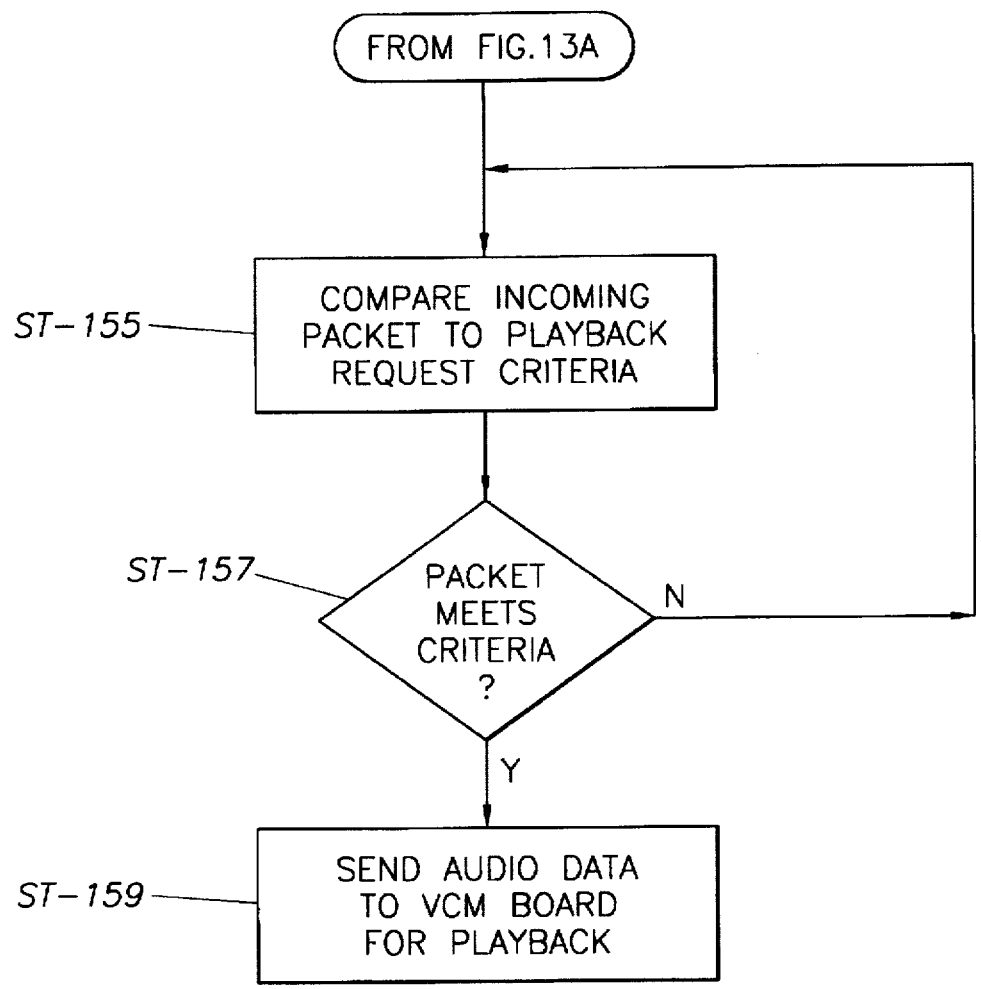

FIGS. 13A through 13C illustrate playback of compressed audio data. When a user requests (ST-125) that the IDLRS play back a recorded conversation, the IDLRS asks (ST-127) the user to provide data selection criteria that identify the data to be retrieved, including either the talk group ID, the radio ID or the system channel ID, and a date/time window for the search. If the user provides a group ID, the IDLRS 10 plays back the group's conversation as though the user were listening to a trunking receiver set for the selected group. If the user specifies a particular radio ID, the IDLRS plays back all transmissions from the specified radio in the specified time frame regardless of the talk group to which each transmission belongs. This type of playback is particularly useful for recovering private or telephone interconnect conversations. If the user specifies a particular system channel, the IDLRS plays back all transmissions on that channel during the specified time window regardless of the talk group or radio responsible for the transmissions.

When the user requests (ST-129) playback of recorded audio, the controller scans (ST-131) the records 93 in the directory file 91 (FIG. 10) to determine which save sets contain the transmissions for the specified time period. If any of the affected save sets are stored (ST-133) to tape, the IDLRS prompts (ST-135) the user to place the corresponding tape volume in the tape drive. The controller then copies (ST-137) the affected save sets to the hard disk and searches (ST-139) the control file in each save set for all channel grants matching the user's playback criteria. Thus, if the user requests a playback of all transmissions within a given talk group during a specified time window, the controller searches the control files of each save set within that time window for channels grants to that talk group. If the controller finds (ST-141) any channel grants, it uses the channel grant's time stamp to quickly search (ST-143) the index file of the corresponding save set. When the time stamp is found (ST-145) in the index file, the controller searches (ST-147) the index file record-by-record to locate all data packets matching the user's criteria (i.e., corresponding to the channel grant). Each record that matches the criteria is used to identify and retrieve (ST-149) a data packet from the save set's voice file. Once the controller has retrieved a packet, it strips (ST-151) the header from the packet and provides (ST-153) the packet to the VCM board for conversion into audio. The user may select playback of a desired conversation in one of two formats: actual rate (transmissions spaced as they actually occurred) or compressed rate (transmissions spaced with a two second pause in between) to eliminate dead time.

The user also may request live playback to monitor transmissions as they are recorded. During live playback, the controller compares (ST-155) all data packets to the playback request criteria as the packets are recorded. If a packet meets (ST-157) the criteria, the controller sends (ST-159) a copy of the audio data back to the VCM board for conversion into sound signals. Because the transmissions are processed by the VCM boards before they are played through the speaker, the user is able to hear the transmissions as they are recorded instead of directly from the communication channel.

Referring again to FIG. 5, to play back stored audio, the controller 17 retrieves one channel-second of digital audio data (one data packet) from the hard disk 21 or the mass storage medium 25, strips off the indexing information, and places the 594 bytes of data into the dual port RAM 24 of the VCM board 13. The controller 17 then sets a status bit in the DSPs 15A, 15B that instructs the DSPs 15A, 15B to decompress the digital audio data. The DSPs 15A, 15B retrieve the data from RAM 24A, 24B eighteen bytes at a time and convert the data into 240 14-bit PCM samples representing 30 ms of audio. The DSPs 15A, 15B then send the decompressed data to the codecs 20A, 20B for playback. The codecs 20A, 20B convert the decompressed data into ground-referenced analog signals S7A, S7B, which are fed through a power amplifier 26 and played through the speaker 33.

During playback, the IDLRS allows the user to pause the playback, to stop the playback, to search forward (2×), to search backward (2×), to rewind to the start of a selected audio segment, to fast forward to the end of the selected audio segment, and to play the audio. In addition, the system is able to retrieve a desired segment from the hard disk 21 if it still resides on the hard disk 21, or from tape drives 25A, 25B if not. Furthermore, the IDLRS can play back audio while it receives, encodes and records incoming audio. The operation of the DSPs 19A, 19B (FIG. 5) is sufficiently fast that the DSPs 15A, 15B can encode one packet and decode another packet in the 30 ms during which it collects audio samples for the next packet. The IDLRS 10 also may have a dedicated playback channel, as discussed above. Thus, the IDLRS is able to service playback requests without interrupting the continued logging of transmissions from the trunking radio system.

The IDLRS also includes a remote playback operation that permits remote access to the system from a properly equipped personal computer. This feature allows a remote authorized user to issue search commands for and play a conversation that meets specified criteria, and to receive the requested information in either digital or analog format.

Figure 14:
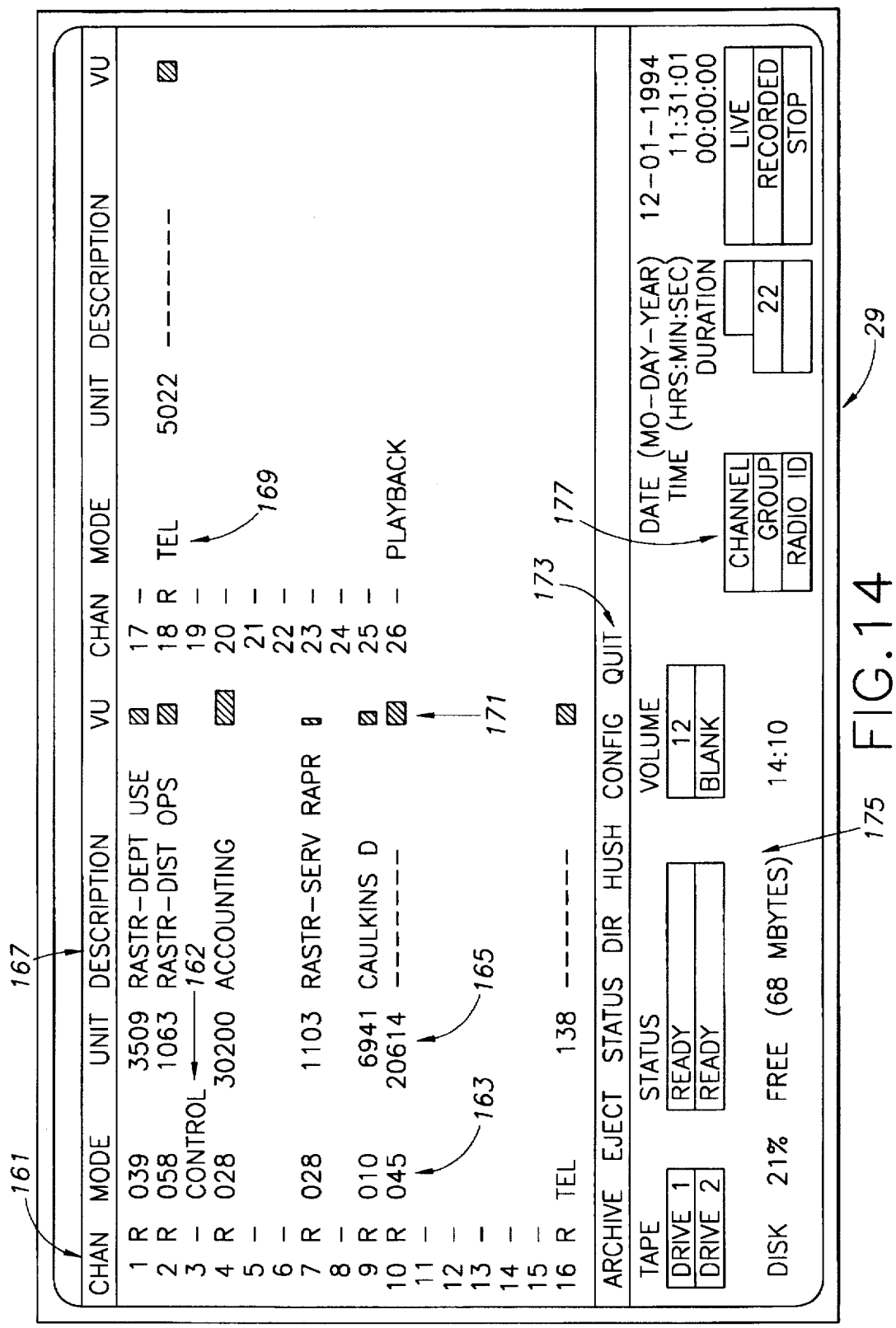
FIG. 14 illustrates a typical logging recorder display.

FIG. 14 shows a display 29 of typical trunking radio system activity and typical recording and playback activity of the IDLRS 10. The display 29 shows each system channel 161 with transmission information beside it. The system channel 161 serving as the control channel is identified by a "CONTROL" label 162 beside the system channel number. When a channel grant is received for a channel, the display 29 shows the group ID 163 and the radio ID 165 of the requesting subscriber station next to the granted channel number. The display 29 also shows a user-recognizable description 167 (e.g., a radio owner's name) for the radio producing the transmission. If the channel grant involves a telephone interconnect, "TEL" 169 is displayed instead of a group ID (since there is no group ID for a telephone interconnect). Also, if the channel grant involves a private transmission, "PVT" (not shown) is displayed instead of a group ID. If a channel grant involves an emergency group, the channel grant information is displayed in red characters (not shown). The display 29 also provides a graphical indication 171 of the amplitude of each transmission and a command bar 173 that allows the user to interface with the system. The display also provides information 175 about the system's storage media and an area 177 for the user to input playback selection criteria.

As is apparent from the above, the invention provides the ability to log and selectively play back data from a trunking radio system in an economically feasible manner. Thus, the necessity of having a large number of receivers and recorders is obviated. At the same time, high quality audio playback of any desired segment of information can be achieved by accessing the user-friendly play back feature of the invention.

While various embodiments of the invention are shown and described, the invention is not limited thereto, but rather is limited only by the scope of the appended claims.

What is claimed is:

1. A logging recorder for a trunking radio system having a plurality of channels that carry streams of segments from unrelated conversations according to channel assignment information generated by a trunking controller, comprising:
   a plurality of fixed frequency radios each of which monitors a selected one of said plurality of channels;
   a controller which monitors said fixed frequency radios and generates identification information corresponding to said segments based upon said channel assignment information;
   means for combining each of said segments with said corresponding identification information; and
   means for storing said segments and said identification information on a storage device.

2. A logging recorder as claimed in claim 1, further comprising means for playing back a desired conversation by automatically retrieving and combining appropriate ones of said segments based upon said identification information.

3. A logging recorder as claimed in claim 1, further comprising means for digitizing selected outputs of said fixed frequency radios.

4. A logging recorder as claimed in claim 3, further comprising means for compressing the digitized selected outputs.

5. A logging recorder as claimed in claim 1, wherein said identification information is appended to a corresponding one of said segments prior to storage.

6. A logging recorder as claimed in claim 1, wherein said identification information comprises a channel identifier.

7. A logging recorder as claimed in claim 1, wherein said identification information comprises a user identifier.

8. A logging recorder as claimed in claim 1, wherein said identification information comprises a talk group identifier.

9. A logging recorder as claimed in claim 1, wherein said identification information comprises a time identifier.

10. A logging recorder as claimed in claim 1, wherein said identification information comprises a channel identifier, a talk group identifier, and a time identifier.

11. A logging recorder as claimed in claim 5, wherein said identification information comprises a channel identifier.

12. A logging recorder as claimed in claim 5, wherein said identification information comprises a user identifier.

13. A logging recorder as claimed in claim 5, wherein said identification information comprises a talk group identifier.

14. A logging recorder as claimed in claim 5, wherein said identification information comprises a time identifier.

15. A logging recorder as claimed in claim 5, wherein said identification information comprises a channel identifier, a talk group identifier, and a time identifier.

16. A logging recorder as claimed in claim 1, wherein said storage device comprises a hard drive.

17. A logging recorder as claimed in claim 1, wherein said storage device comprises magnetic tape.

18. A logging recorder as claimed in claim 1, wherein said storage device comprises an electronic memory device.

19. The logging recorder as claimed in claim 1, wherein the storage device comprises an optical storage device.

20. A digital logging recorder for a trunking radio system having a plurality of channels that carry streams of segments from unrelated conversations according to channel assignment information generated by a trunking controller, comprising:
   means for monitoring the plurality of channels and outputting analog signals representative thereof;
   means for digitizing selected ones of said analog signals;
   control means for monitoring the digitized signals and generating identification information corresponding to said segments based upon said channel assignment information;
   means for combining each of said segments with said corresponding identification information; and
   means for storing said segments and said identification information on a storage device.

21. A logging recorder as claimed in claim 18, further comprising means for playing back a desired conversation by automatically retrieving and combining appropriate ones of said segments based upon said identification information.

22. A method of logging a trunking radio system having a plurality of channels that carry streams of segments from unrelated conversations according to channel assignment information generated by a trunking controller, comprising the steps of:
   monitoring said plurality of channels;
   generating identification information corresponding to said segments based upon said channel assignment information;
   combining each of said segments with said corresponding identification information; and
   storing said segments and said identification information on a storage device.

23. The method of claim 22, further comprising the step of converting the segments to digital signals.

24. The method of claim 22, further comprising the step of appending said identification information to a corresponding one of said segments.

25. A digital logging system, comprising:
   a plurality of fixed frequency radios each of which monitors a selected channel of a trunking radio system;
   a controller which monitors said fixed frequency radio and records selected segments of outputs thereof on a mass storage device in indexed fashion according to information received from a trunking controller; and
   means for playing back a desired conversation by automatically combining said segments based on said index.

26. A digital logging recorder for a trunking radio system having a plurality of communication channels that transmit communications between subscriber stations according to control information generated by a trunking controller, comprising:
   a plurality of receivers, each of which receives a transmission from one of the communication channels and outputs an analog audio signal;
   signal processing circuitry which converts the analog audio signal into segments of digital audio data each of which contains a portion of the transmission;

a controller which receives the control information and generates indexing information corresponding to each of the segments of digital audio data and which combines the indexing information with the corresponding segment of digital audio data, the indexing information identifying the portion of the transmission contained in the corresponding segment of digital audio data; and a storage medium which stores the indexed segments of digital audio data.

27. The digital logging recorder of claim 26, wherein the signal processing circuitry comprises:

conversion circuitry which converts the analog audio signal into a plurality of digital samples; and a digital signal processor which compresses the digital samples into the segments of digital audio data.

28. The digital logging recorder of claim 27, wherein the digital signal processor is configured to collect a predetermined number of said digital samples and to compress said predetermined number of digital samples into a digital audio data segment of predetermined size.

29. The digital logging recorder of claim 26, wherein the storage medium includes sets of digital audio data segments, each of which is capable of accepting a predetermined maximum number of the segments of digital audio data.

30. The digital logging recorder of claim 26, further comprising a mass storage medium which receives one of the sets of digital audio data segments when the set of digital audio data segments reaches the predetermined maximum number of segments.

31. The digital logging recorder of claim 26, wherein the indexing information provides at least one of the following pieces of information about each transmission: identification of a subscriber station originating the transmission, group identification of subscriber stations involved in the transmission, identification of the communication channel carrying the transmission, and a time identifier.

32. The digital logging recorder of claim 26, wherein the signal processing circuitry is configured to convert the digital audio data segments into an analog audio playback signal.

33. The digital logging recorder of claim 26, wherein the controller is configured to receive a playback criterion from an operator and to compare the playback criterion against the indexing information corresponding to each of the segments of digital audio data; and wherein if the indexing information corresponding to one of the segments of digital audio data satisfies the playback criterion, the signal processing circuitry is configured to convert that segment of digital audio data into an analog playback signal and to provide the analog playback signal to a sound reproducing device.

34. A method of logging a transmission from a trunking radio system having a plurality of communication channels controlled by control information generated by a trunking controller, comprising:

recovering from the control information data allocating one of the communication channels for the transmission;

receiving an analog audio signal transmitted on the allocated communication channel;

converting the analog audio signal into segments of digital audio data each of which contains a portion of the transmission;

generating indexing information corresponding to each of the segments of digital audio data, the indexing information identifying the portion of the transmission contained in the corresponding segment of digital audio data;

combining the indexing information with the corresponding segment of digital audio data; and storing each of the indexed segments of digital audio data to a storage medium.

35. The method of claim 34, further comprising the step of reconstructing the analog audio signal from the stored segments of digital audio data.

36. The method of claim 35, wherein the step of reconstructing the analog audio signal comprises:

generating a data segment selection criterion;

retrieving selected ones of the stored segments of digital audio data from the storage medium according to the data segment selection criterion;

converting the retrieved segment of digital audio data into an analog audio playback signal; and playing the analog audio playback signal through a sound reproducing device.

37. A method of playing back a trunking radio transmission stored as segments of digital audio data on a storage medium, the method comprising:

generating a data selection criterion which provides information about the trunking radio system transmission;

comparing the data selection criterion against data segment indexing information to identify each of the segments of digital audio data corresponding to the trunking radio transmission;

retrieving each of the identified segments of digital audio data from the storage medium;

converting each of the retrieved segments of digital audio data into an analog sound signal; and playing the analog sound signal through a sound reproducing device.

38. The method of claim 37, wherein the step of converting each of the retrieved segments of digital audio data into an analog sound signal comprises:

expanding each of the retrieved segments into a plurality of digital audio samples; and converting the digital audio samples into an analog signal.

39. A method of simultaneously recording and playing back a trunking radio system transmission comprising:

receiving an analog audio signal transmitted on one of a plurality of trunking radio channels;

converting the analog audio signal into a digital signal;

dividing the digital audio signal into a plurality of data segments;

storing each of the data segments to a storage medium;

comparing each of the data segments to a predetermined playback criterion; and if one of the data segments satisfies the predetermined playback criterion, converting the data segment into an analog playback signal and playing the analog playback signal through a sound reproducing device.

40. The method of claim 39, further comprising the steps of:

using a signal processor in a signal coding mode to create the plurality of data segments; and switching the signal processor into a signal decoding mode to create the analog playback signal.

* * * * *